United States Patent Office 3,371,116
Patented Feb. 27, 1968

3,371,116
DIMERIC FATTY HYDROCARBON
POLYQUATERNARY AMINES
Robert Nordgren and Harold A. Wittcoff, Minneapolis, Minn., assignors to General Mills, Inc., a corporation of Delaware
No Drawing. Filed May 21, 1964, Ser. No. 369,300
5 Claims. (Cl. 260—567.6)

The instant invention relates to poly-quaternary ammonium salts, and more particularly to certain poly-quaternary ammonium salts whose cations are poly-quaternary ammonium polymeric condensates of dimeric fat bis-tertiary amines and bis-quaternizing reagents therefor.

On Oct. 28, 1941, U.S. Patent No. 2,261,002 issued to Ritter, relating to certain polymeric quaternary ammonium compounds, which Ritter obtained by condensing bis-tertiary amines with certain organic dihalides which Ritter alleged to function as quaternizing reagents in the formation of polymeric quaternary ammonium salts. Ritter indicates that certain undesirable results such as the formation of cyclic compounds may be avoided in the practice of his invention, but his teachings relate to the use of materials which, generally, have not been made available to the trade at competitive prices. Moreover, although Ritter does make a very general suggestion concerning certain specific uses for his materials, the disclosure of Ritter is not directed particularly to teachings as to how his materials might be used in the several uses mentioned, but rather the teachings of Ritter are devoted primarily to certain aspects of the chemistry of polymeric poly-quaternary ammonium compounds using diamines wherein the tertiary amine nitrogens are joined preferably by radicals containing not more than about six carbon atoms in order to obtain speed in polymer formation. To this end Ritter suggests wholly saturated diamines, in which category the tertiary amino nitrogens are not described as being spaced apart by more than a $C_{10}$ carbon linkage, although Ritter at least mentions a $C_{18}$ linkage between tertiary amino nitrogens, in which one contains the unsaturated allyl substituent (page 3, column 2). In addition, Ritter teaches that in his dihalides, the halogen groups are preferably linked together by simple structures of no more than nominal length, with a $C_{12}$ linkage being the indicated maximum size near the top of column 1, at page 4. The general suggestion of Ritter apears to be that speed of polymerization is of considerable importance to him in view of the relatively substantial reaction times mentioned in the various examples, and simplicity in the nature of only nominal carbon chain lengths between the functional amino nitrogens and the functional halides appear to be preferred, down to a total "radical length" which Ritter teaches should exceed 7 to avoid ring formation instead of polymer formation.

Subsequent workers in the general field of poly-quaternary ammonium compounds, some fifteen to twenty years later, have indicated a distinct preference toward relatively simple, monomeric types of compounds. For example, Hwa, who issued U.S. Patents Nos. 2,933,529 and 3,079,-436, is concerned primarily with di-quaternary ammonium compounds characterized by his selection of a relatively short $C_2$–$C_4$ linkage between the quaternary nitrogens, which linkage is defined as "E" in the Hwa disclosures, which are concerned primarily with reacting a di-tertiary amino (in which the amino nitrogens are thus closely linked together) with an essentially mono-functional quaternizing reagent, i.e., a monohalide or similar mono-functional reagent, thereby precluding the possibility of polymeric formation in accordance with the much earlier teaching of Ritter.

Wien issued U.S. Patent No. 2,731,500 in 1956, which relates specifically to a di-quaternary ammonium salt useful purportedly for pharmaceutical purposes, which is formed by reaction of a di-tertiary amine wherein the nitrogens are connected by a specific, unsymmetrical linkage, with certain mono-functional quaternizing agents, which are simple alkyl halides selected for the therapeutic use contemplated.

Taube U.S. Patent No. 3,009,761 describes the reaction of low molecular weight di-tertiary ethylene diamine with a relatively low molecular weight dihalide, which Taube teaches should have an interruption in the chain between the halogens; and although Taube is consistent with the much earlier teachings of Ritter concerning a minimum radical length of 7, Taube is very specific in connection with the variants available in the case of the two di-functional reactants, and also very specific in suggesting the use of his product in the treatment of dyed cellulosic fiber.

Harrison, McCaleb and Ward issued U.S. Patent No. 3,073,864 to the assignee of the subject matter of the instant invention, and Harrison et al. disclose the condensation of certain mono-functional quaternizing reagents, i.e. mono-halides, and the like with poly-tertiary amines derived from the polymeric fat acid material.

In the instant invention, it has been found that certain very distinct advantages may be obtained by application of the principles of polymeric condensation to essentially bis-tertiary amines of substantially dimeric fat amine origin and bis-quaternizing reagents therefor, whereby distinct improvements in such fundamental characteristics as the hydrophil-hydrophobe balance may be achieved, and specific use improvements in selected fields of use such as flocculation of slime may be achieved accordingly. Although the polymeric poly-quaternary ammonium compounds of the instant invention have distinctly superior characteristics for certain uses, it will be appreciated that they are not necessarily limited to these uses, as hereinafter explained.

It is, however, an important object of the instant invention to provide a novel and useful family of chemical compounds.

It is a further object of the instant invention to provide a unique family of compounds, and method of producing the same, involving numerous practical aspects including selective control of hydrophobe-hydrophil balance, practical economies in the use of materials and procedures, multiplicity of diverse uses, and distinct superiority in certain uses including the flocculation of slime and the like usage.

Other and further objects, features and advantages of the present invention will be come apparent to those skilled in the art from the following detailed disclosure thereof and the examples hereinafter set forth.

Essentially the invention consists in a unique family of compounds which are poly-quaternary ammonium salts, the anions of which are salt-forming quaternizing groups, and the cations of which are poly-quaternary ammonium substantially linear polymeric condensates of a dimeric fat bis-tertiary amine and a bis-quaternizing reagent therefor, the amine being represented by the structural formula:

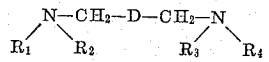

wherein D is a dimeric fat radical and each of the groups $R_1$, $R_2$, $R_3$ and $R_4$ is a $C_1$–$C_{18}$ aliphatic group; and the invention also consists in the method of forming such salts by condensation of the aforesaid reactants.

Chemically the bis-tertiary amine compounds (I) used in the practice of the invention may be defined as:

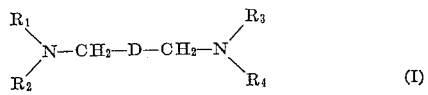
(I)

wherein $R_1$, $R_2$, $R_3$ and $R_4$ are substituted or unsubstituted aliphatic radicals, and D is substantially the dimeric fat acid radical as defined infra.

The term polymeric fat acid can be defined as follows: the term "fat acids" is intended to include saturated ethylenically unsaturated and acetylenically unsaturated naturally occurring and synthetic monobasic aliphatic acids containing from 8–24 carbon atoms. The term "polymeric fat acid" refers to polymerized fat acids. The term "polymeric fat radical" refers to the hydrocarbon radical of a polymerized fat acid, and is generic to the divalent, trivalent, and other polyvalent hydrocarbon radicals of dimerized fat acids, trimerized fat acids and higher polymers of fat acids. The divalent and trivalent hydrocarbon radicals are referred to herein as "dimeric fat radical" and "trimeric fat radical" respectively.

It will be appreciated that the subsequently described procedures for the preparation of compounds containing "polymeric fat radicals" are generally procedures for obtaining mixtures wherein compounds containing "dimeric fat radicals" may predominate, or by known purification and/or distillation techniques may be separated substantially (but seldom completely) from compounds containing trimerc or higher polymeric fat radicals. The starting material (I) is described as substantially di-tertiary dimeric fat amines, i.e., wherein D is substantially the dimeric fat acid group, and although complete isolation of such dimeric fat amines (to the exclusion of other polymeric fat amines) is recognized as impractical if not impossible, but it has been found that superior results appear to be obtained in the practice of the invention using substantially dimeric fat ditertiary amines which have been distilled to obtain a more pure "cut."

The saturated, ethylenically unsaturated, and acetylenically unsaturated fat acids are generally polymerized by somewhat different techniques, but because of the functional similarity of the polymerization products, they all are generally referred to as "polymeric fat acids."

Saturated fat acids are difficult to polymerize but polymerization can be obtained at elevated temperatures with a peroxidic catalyst such as di-t-butyl peroxide. Because of the generally low yields of polymeric products, these materials are not currently commercially significant. Suitable saturated fat acids include branched and straight acids such as caprylic acid, pelargonic acid, capric acid, lauric acid, myristic acid, palmitic acid, isopalmitic acid, stearic acid, arachidic acid, behenic acid, and lignoerc acid.

The ethylenically unsaturated acids are much more readily polymerzed. Catalytic or non-catalytic polymerization techniques can be employed. The non-catalytic polymerization generally requires a higher temperature. Suitable catalysts for the polymerization include acid or alkaline clays, di-t-butyl peroxide, boron trifluoride and other Lewis acids, anthraquinone, sulfur dioxide and the like. Suitable monomers include the branched straight chain, poly and mono ethylenically unsaturated acids such as 3-octenoic acid, 11-dodecanoic acid, linderic acid, lauroleic acid, myristoleic acid, tsuzuic acid, palmitoleic acid, petroselinic acid, oleic acid, elaidic acid, vaccenic acid, gadoleic acid, cetoleic aid, nervonic acid, linoleic acid, linolenic acid, eleostearic acid, hiragonic acid, moroctic acid, trimodonic acid, eicosatetraenoic acid, nisinic acid, scoliodonic acid and chaulmoogric acid.

The acetylenicalily unsaturated fat acids can be polymerized by simply heating the acids. Polymerization of these highly reactive materials will occur in the absence of a catalyst. The acetylenically unsaturated acids occur only rarely in nature and are expensive to synthesize.

Therefore, they are not currently of commercial significance. Any acetylenically unsaturated fat acid, both straight chain and branched chain, both mono-unsaturated and poly-unsaturated, are useful monomers for the preparation of the polymeric fat acids. Suitable examples of such materials include 10-undecynoic acid, tariric acid, stearolic acid, behenolic acid, and isomic acid.

Because of their ready availability and relative ease of polymerization, oleic and linoleic acid are the preferred starting materials for the preparation of the polymeric fat acids.

The bis-tertiary dimeric fat amines used in the present invention are readily prepared by the method of Fisher et al application U.S. Serial No. 92,144, filed February 28, 1961, now U.S. Patent No. 3,190,922, incorporated by reference in the present application. The carboxyl groups of polymeric fat acids are converted to their disubstituted amides, preferably in the presence of an excess of secondary amine, and then converted to the tertiary amine by hydrogenation in the presence of a suitable catalyst. This reaction may be diagrammed as follows:

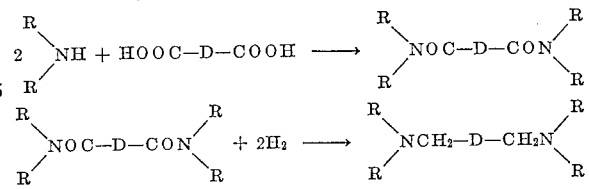

where D is as described above and R has the meaning ascribed to $R_1$, $R_2$, $R_3$ and $R_4$ above.

Suitable secondary amines for use in the conversion to the disubstituted amide groups of the above starting materials for the preparation of the tetraalkyl dimeric fat amines are

where $R_1$ and $R_2$ can be saturated or unsaturated aliphatic hydrocarbon radicals of from 1 to 18 carbon atoms, or substituted aliphatic radicals, e.g., dimethyl amine, diethyl amine, di-(2-ethylhexyl) amine, dilauryl amine, distearyl amine, dioleyl amine, dilinoleyl amine, secondary fatty amines derived from natural fats and oils such as tallow, coco, soy, cottonseed, etc., and the like; or hydroxy-substituted amines such as diethanol amine, di(hydroxystearyl) amine and the like.

The bis-quaternizing reagent (II) used in the practice of the invention may be represented by the formula:

$$X—R_5—X \qquad (II)$$

wherein each X is preferably one of the more conventionally recognized salt-forming quaternizing groups such as halogens of atomic weight of at least 35, i.e., Cl, Br and/or I, but X may also represent other quaternizing groups such as sulfate, methyl sulfate, ethyl sulfate, phosphate, hydroxide, etc., acetate and the anions of other typical ionizable organic acids, i.e. $C_2$–$C_6$ alkanoates and hydroxy alkanoates, citrate, tartrate, bitartrate, etc., methyl benzene and methyl p-toluene sulfonate, etc.

In the reagent (II), the divalent "alkylating" group $R_5$ as it is sometimes referred to is an organic group wherein the X bonds are preferably connected to different C atoms, in fact, preferably different —$CH_2$— (methylene) groups. Numerous typical reagents (II) useful in the practice of the invention include the dihalides disclosed in Ritter U.S. Patent No. 2,261,002 (incorporated herein by reference), in that the divalent $R_5$ group is preferably a $C_2$–$C_4$ aliphatic hydrocarbon or $C_3$–$C_4$ hydroxyalkylene group, since the radical size of the dimeric fat bis-tertiary amine group (I) is substantial in size; but $R_5$ may be a saturated or unsaturated (i.e. aromatically or olefinically) aliphatic, straight or branched chain, cyclic or acyclic, aromatic or aliphatic-aromatic $C_2$–$C_{18}$ hydrocarbon group with or without substituents which do not interfere with the bi-functional quaternizing capacity of the reagent (II). Thus in the case of di-halides, the X groups may be selected from the more economic Cl or the successively more reactive Br and I groups, in which case $R_5$ may be substituted with relatively non-functional or inert groups vis-a-vis the quaternization reaction such as ether, hydroxy, keto, carboxyl, ester, and the like O containing groups; the thio counterparts, such as thioether, thiol, thionyl, carbothionic, carbothiolic, dithionyl, etc.; nitro, amido, cyano, etc. In other words, particularly in cases wherein the X groups of X—$R_5$—X (II) are highly functional Cl, Br and/or I groups, then the divalent potential polymer unit —$R_5$— may contain atoms other than C and H, which do not interfere significantly with the bis-functionality of the reagent X—$R_5$—X (II) during quaternization of the bis-tertiary amine (I), and such other atoms may include from about 1 to 4 O atoms in ether, hydroxy, keto, carboxyl, etc. groups; 1 to 2 S atoms in the thio counterparts of such groups; and 1 to 2 N atoms in nitro, amido, cyano, and the like inert groups. In such use of highly functional dihalides X—$R_5$—X (II) to form the polymeric cation, it will be appreciated that X− (halide) groups resulting in the anion may be replaced in part or in whole, by such other anion groups as the sulfates, phosphates, acetates, etc. (previously mentioned) by metathesis; or in instances wherein it is desired to use such last mentioned groups in the initial bis-quaternizing reagent (II), the chemist will recognize that a certain amount of selectivity may be required with respect to the —$R_5$— group to substantially avoid interference with the "bis-functionality" of the reagent. Thus the relatively inert ether linkages in the —$R_5$— group could still be retained, even though less reactive X groups were employed in the reagent X—$R_5$—X (II) and substantially more drastic reaction conditions were used (e.g. with methyl sulfate, sulfate, acetate, etc. reagent X groups); but comparatively less inert substituents in —$R_5$— such as hydroxyl groups could interfere.

The invention will be further illustrated in conjunction with the following examples, which are intended as illustrative only and not by way of limitation.

EXAMPLE I

Into a 1000 ml. reactor were charged 600 grams of N,N,N',N'-tetra-(2-ethylhexyl) diamide prepared from dimerized linoleic acid and di-(2-ethylhexyl) amine. The acid value of the diamide was 8.8. Thirty grams of copper-chromium oxide catalyst was added and the reaction was pressurized with hydrogen to 400 p.s.i.g. and heated to 260° C. and maintained at this temperature while gases consisting mostly of hydrogen and by-product water were continually vented from the system, the pressure being maintained at 400 p.s.i.g. over a period of 54 hours at which point the reaction was cooled to 100° C., the hydrogen vented and the product filtered. Analysis of the clear light-colored product indicated that it was 93.0% of N,N,N',N'-tetra-(2-ethylhexyl) dimeric fat amine.

EXAMPLE II

Into a 1000 ml. reactor were charged 600 grams of N,N,N',N'-tetramethyl diamide (acid number=2.4) of distilled dimeric linoleic acid and 60 grams of copper-chromium oxide catalyst (Girdler's G–13). The reactor was pressurized with hydrogen to 400 p.s.i.g. The reactor was heated to 260° C. and maintained at this temperature while gases were continuously vented from the system. The pressure was maintained with hydrogen at 400 p.s.i.g. After 35.5 hours the reactor was cooled to 100° C., the hydrogen vented and the product filtered. Analysis of the clear light-colored product indicated that it was essentially all N,N,N',N'-tetramethyl dimeric fat amine with only 1.1% of non-amine present. The total amine number was 149 and the tertiary amine number was 149.

EXAMPLE III

Into a pressure reactor were charged 295 pounds of tetramethyl dimer diamide and 14.7 pounds of Girdler's G–13 catalyst. The reaction was pressurized to 650 p.s.i.g. with hydrogen and heated to 250° C. At this time the hydrogen circulation pump was started and also the dimethyl amine feed pump. The water formed by the hydrogenation was removed from the circulating hydrogen by means of scrubber which condensed water vapor and absorbed dimethyl amine. After about 10 hours of hydrogenation, during which time dimethyl amine was added continuously, the product was filtered and analyzed.

Total amine number=174
Tertiary amine number=171
Gardner color=1

The product was virtually all N,N,N',N'-tetramethyl dimeric fat amine.

Other tetrasubstituted diamines can be prepared as described in these examples by substituting for the simple aliphatic secondary amines contemplated above. As previously indicated simple secondary amines such as dimethyl amine are particularly satisfactory, but higher di-($C_1$–$C_{18}$ alkyl) amines are readily used to demonstrate the invention.

EXAMPLE IV

Comparisons were run with selected bis-tertiary amines and selected amine to chloride molar ratios using as the bis-quaternizing reagent, 1,4-dichlorobutene-2, in accordance with process conditions which involve charging a reaction flask equipped with a thermometer, stirrer and condenser with the ingredients and in the amounts hereinafter indicated, including the amounts of isopropanol specified, and then reacting the materials under the reaction conditions, all specified in detail hereinafter in Table I.

The tetramethyl dimer diamines, i.e. bis-tertiary amines used were selected from the following groups:

(a) Pilot Plant Product (Example III hereof)—used in runs 2, 4, 5, 7, 8 and 9 of Table I:

| | |
|---|---|
| Amine No. | 174 |
| II and III amine | 173.5 |
| III amine | 171 |
| Percent nitrogen | 4.3 |

(b) Laboratory Product (Example II hereof)—used in runs 1, 3 and 6 of Table I:

| | |
|---|---|
| Amine No. | 149.6 |
| II and III amine | 149.0 |
| III amine | 149.2 |
| Percent nitrogen | 3.67 |

(c) Purified Pilot Plant Produced used in runs 18–21 of Table I.

The product described in (a) above was purified by distillation under reduced pressure at temperatures of 325–340° C. The product now analyzes:

| | |
|---|---|
| Amine No. | 187.6 |
| II and III amine | 183.4 |
| III amine | 183.5 |
| Percent nitrogen | 4.59 |

It will be seen in footnotes (a), (b) and (c) on Table I that the run numbers are correlated with the diamines used in column 1, and it will also be noted that the purified product (c) used in runs 18 through 21 demonstrates rather clearly the reduced tendency toward gelling that is obtained by purification of the dimer (presumably for purposes of reducing trimer content or other high molecular weight material tending to cause cross-linking and gelling), although the molar ratios indicated in column 4 of Table I do demonstrate rather convincingly that at substantially equimolar ratios a higher molecular weight polymer is obtained.

TABLE I

| | | | | | Reaction Conditions | |
|---|---|---|---|---|---|---|
| Col. No. 1 | 2 | 3 | 4 | 5 | 6 | |
| Run No. | Product Appearance | Tetramethyl dimer diamine (g.) | Molar Ratio Dichloride Diamine | Isopropanol (g.) | Time, Hrs. | Max. Temp., °C. |
| 1 | Gel | 126.0 | 1.0(d) | 147.0 | 1.25 | 90.0 |
| 2 | Gel | 161.5 | 1.1(d) | 199.0 | 2.0 | 86 |
| 3 | Almost a Gel | 94.0 | 1.15(d) | 126.0 | 2.75 | 85 |
| 4 | Viscous Liquid | 161.5 | 1.2(d) | 199.0 | 2.75 | 84 |
| 5 | do | 161.5 | 1.3(d) | 199.0 | 2.0 | 75 |
| 6 | do | 38.0 | 1.5(d) | 57.0 | 2.6 | 73 |
| 7 | Less Viscous Liquid | 161.5 | 1.8(e) | 199.0 | 2.0 | 87 |
| 8 | Gel | 161.5 | 1.0(f) | 205.5 | 0.4 | 86 |
| 9 | Viscous Liquid | 161.5 | 1.2(f) | 205.0 | 0.5 | 85 |
| 18 | Very Fluid Liquid | 153.0 | 1.14(d) | 186.0 | 2.0 | 89 |
| 19 | Fluid Liquid | 153.0 | 1.02(d) | 370.0 | 2.0 | 88 |
| 20 | Very Viscous Liquid | 153.0 | 1.00(d) | 184.0 | 1.5 | 95 |
| 21 | Fluid Liquid | 153.0 | 1.02(g) | 186.0 | 52.3 | 115 |

[1] Appearance as 50% solids by weight in isopropanol:
 (a) Runs 2, 4, 5, 7, 8 and 9.
 (b) Runs 1, 3 and 6.
 (c) Runs 18 through 21.
 (d) 1,4-dichlorobutene-2.
 (e) 1,4-dichlorobutene-2 plus NaHCO₃.
 (f) 1,4-bis(chloromethyl) benzene.
 (g) 1,3-dichloropropane-2-ol.

TABLE II

| Col. No. 1 | 2 | 3 | 4 | 5 |
|---|---|---|---|---|
| Test No. | Slime | pH | P.p.m. | Results |
| Control | Hydrous iron oxide (0.5% solids) | 6 | | 60 cc. of floc. in 1:30.[1] |
| 1589-147 [2] | do | 6 | 5 | 60 cc. of floc. in 1:13. |
| 1589-147 | do | 6 | 10 | 60 cc. of floc. in 1:22. |
| 1589-147 | do | 6 | 1 | 60 cc. of floc. in 0:52. |
| 1589-147 | do | 6 | 2 | 60 cc. of floc. in 0:63. |
| 1589-147 | do | 6 | 0.5 | 60 cc. of floc. in 0:43. |
| 1589-147 | do | 6 | | 15 cc. of floc. in 18:00. |
| Control | 10% premix Kaolin (non-dispersed) | 6 | | 60 cc. of floc. in 2:45. |
| 1589-147 | do | 6 | 10 | 60 cc. of floc. in 3:35. |
| 1589-147 | do | 6 | 15 | 60 cc. of floc. in 3:55. |
| 1589-147 | do | 6 | 5 | 60 cc. of floc. in 4:00. |
| 1589-147 | do | 6 | 20 | 60 cc. of floc. in 7:45. |
| Control | International Minerals phosphate slime (diluted 10X) | 7 | | 60 cc. of floc. in 2:45. |
| 1589-147 | do | 7 | 10 | 60 cc. of floc. in 1:17. |
| 1589-147 | do | 7 | 5 | 60 cc. of floc. in 1:37. |
| 1589-147 | do | 7 | 1 | 60 cc. of floc. in 1:08. |
| Control | Iron oxide (0.5% solids) | 7 | | 60 cc. of floc. in 1:04. |
| 1589-147 | do | 7 | 1 | 60 cc. of floc. in 1:01. |
| 1589-147 | do | 7 | 5 | 60 cc. of floc. in 0:54. |
| 1589-147 | do | 7 | 10 | 60 cc. of floc. in 0:39. |
| 1589-147 | do | 7 | 50 | 60 cc. of floc. in 1:08. |
| 1589-149 [3] | do | 7 | 20 | 60 cc. of floc. in 0:57. |
| 1589-149 | do | 7 | 50 | 50 cc. of floc. in 20:25. |
| Control | 2% premix Kaolin (non-dispersed) | 7 | | 50 cc. of floc. in 13:35. |
| 1589-147 | do | 7 | 50 | 50 cc. of floc. in 15:00. |
| 1589-149 | do | 7 | 100 | 50 cc. of floc. in 20:00. |
| Control | 1% International Minerals phosphate slime | 7 | | 50 cc. of floc. in 5:00. |
| 1589-147 | do | 7 | 10 | 50 cc. of floc. in 4:19. |
| 1589-147 | do | 7 | 50 | 50 cc. of floc. in 2:18. |
| 1589-147 | do | 7 | 100 | 50 cc. of floc. in 26:00. |
| 1589-147 | do | 7 | 10 | 50 cc. of floc. in 9:00. |
| 1589-147 | do | 7 | 50 | 50 cc. of floc. in 5:30. |
| 1589-147 | do | 7 | 100 | |

[1] 1 min. 30 sec.
[2] Test No. 1587-147 employed product of Run No. 3 of Table I.
[3] Test No. 1589-149 employed product of Run No. 6 of Table I.

It will be seen that the relative molar ratios of dichloride and diamine are important from the point of view of product appearance in 50% solution by weight in isopropanol, which is not necessarily typical of the manner in which the product would be marketed, but it is indicative of the molecular weight or the number of polymer units obtained in the condensation procedure, which will be found to be higher in number of polymer units or in molecular weight as the molar ratio of dichloride to diamine decreases from preferably just below about 2:1 down to preferably just above 1:1 (i.e. 1.02:1 as indicated in runs 19 to 21).

It will also be noted that the reaction proceeds very readily with the dichloride (d), (e) and (f); but the reaction is many times slower using the dichloride (g) recited in the footnote of Table I.

It will be appreciated that other bis-quaternizing reagents for the diamines may be used to demonstrate the invention, including those listed hereinbefore, and certain compounds listed hereinafter.

Table II presents certain data which serve to demonstate the superiority of the poly-quatenary ammonium compounds in certain functions, namely, flocculation of certain slimes specified in column 2 of Table II. The procedure employed is a standardized procedure which involves charging a 100 milliliter graduate with the amount of slime required to obtain the concentration specified in column 2 of Table II and then adding appropriate buffer to dilute the same to such concentration in a quantity substantially equal to 100 milliliters. The graduate is stoppered and gently inverted four times. Next, the additive is added at the pH indicated in column 3 and in the concentrations indicated in column 4 of Table II and again the graduate is inverted gently four times. After the inversion, the time is measured for the floc to settle to a specified level which is employed in this standardized test, and the level as indicated in Table II at column 5 in terms of cubic centimeters (which are read from the graduate). It will be seen that in the first column of Table II the controls are designated (wherein no polyquaternary ammonium compounds of the invention are used), and in other cases where the compounds of the invention are used test numbers are given and the test numbers are correlated in the footnote to Table II against the run numbers of Table I.

It will be seen that the flocculation is particularly good in the case of many of the various slimes tested and the superiority of the invention is typical of the test results with respect to flocculation shown in Table II.

Also, the products obtained in runs 1 through 9 and 18 through 21 of Table I are tested for bactericidal activity at comparatively dilute concentrations of 100 parts per million, using as test bacteria E. coli and M, pyogenes. The test results are indicated in greater detail in Table III hereinafter in connection with variations in concentrations in contact time for the quaternaries obtained in runs 4 and 9 of Table I.

TABLE III

| Polyquaternary | p.p.m. | Contact Time | E. Coli | M. Pyogenes |
|---|---|---|---|---|
| Run 4 | 500 | 30 sec | ¹3 | ¹18 |
| Do | 500 | 2 min | 0 | 17 |
| Do | 500 | 5 min | 0 | 0 |
| Do | 200 | 30 sec | 5 | 72 |
| Do | 200 | 2 min | 1 | 24 |
| Do | 200 | 5 min | 2 | 0 |
| Run | 500 | 30 sec | 0 | 50 |
| Do | 500 | 2 min | 0 | 0 |
| Do | 500 | 5 min | 0 | 0 |
| Do | 200 | 30 sec | 16 | 99 |
| Do | 200 | 2 min | 0 | 19 |
| Do | 200 | 5 min | 1 | 1 |

¹ The number in these columns refer to the number of colonies found on the petri plates after incubation. Zero values indicate 100% kill. No kill would show too many colonies to count.

The foregoing Table III indicates specifically superior bactericidal properties that were obtained using the polyquaternaries of runs 4 and 9 of Table I, but distinct bactericidal activity was, in fact, demonstrated in the case of all of the various poly-quaternaries obtained and tested.

With reference to the variants which may be used in demonstrating the invention in accordance with the procedures outlined in Examples I through IV, it will be appreciated that the dimeric fat amine product obtained in Example I may be used in place of the amine specified in runs No. 6 and 7 of Table I, in order to obtain a product that is substantially comparable, it being appreciated that the greater size of the aliphatic chains on the tertiary amine will tend to produce a product of greater viscosity and apparently higher molecular weight, but in most other respects the results are comparable.

Also, in connection with the results of Table I (Example IV), it will be appreciated that there are differences in the rate of reaction between the various bis-quaternizing agents (for example see column 6 of Table I), and it has been found that 1,4-dichlorobutene-2 is preferred in the practice of the invention for ease of reaction. The corresponding bromide and iodide counterparts thereof are even more reactive and undergo the reaction with still greater ease, whereas ethylene dichloride and bis-(2-chloroethyl) ether are considerably more difficult to react and are found to require rather drastic reaction conditions of longer times and higher temperatures. The actual reaction temperature may, of course, range from approximately room temperature (for nominal reaction speeds) up to substantially the boiling point of whatever solvent might be used (e.g. isopropanol) or up to still higher temperatures if no solvent is used and the materials are merely reacted together and caused to "melt" together in the course of polymer formation, under which circumstances the maximum reaction temperature is limited solely by the volatility of the materials and/or heat sensitivity of any of these materials. Generally, the reaction temperature will range from about 70 to 120° C. in the preferred embodiments of the invention. In this respect, the reaction conditions mentioned by Ritter are useful and the teachings specifically relating thereto are incorporated by reference. For example, the various dihalides specified by Ritter near the bottom of column 3 may be used in place of the specific dihalide of runs 8 and 9 of Table I, although many of the higher molecular weight dihalides mentioned by Ritter, when used under these particular recation conditions tend to treact more slowly than the compound specified in Table I as (f). In addition, other bis-quaternizing agents such as benzene-1,4-bis-(methyl sulfonate) or benzene-1,4-bis-(methyl acetate) and/or comparable disulfonates and/or dicarboxylic esters may also be used to demonstrate the invention, but generally these are less reactive than the dihalides. Generally, the ultimately obtained anions (of organic nature such as acetates, citrates, etc.) are preferably obtained by metathesis, after carrying out the initial quaternizing reaction with halides, but this is not absolutely necessary.

In addition, the condensation of the bis-tertiary amine and the bis-quaternizing agent need not be carried out in solution, although it preferably is carried out in solution in any inert organic liquid which is the solvent for the reactants and either a solvent or a non-solvent for the polymeric product, e.g. methanol, ethanol, benzyl alcohol, propanol, butanol, dioxan, acetone, and aqueous methanol or ethanol systems. Generally speaking, the temperatures employed are as high as the reactants and the product will permit in order to expedite the reaction, and such temperatures have already been described. Catalysts are not required generally, but may be used, if desired.

It will be found that even certain short chain bis-quaternizing agents such as ethylene dichloride are not necessarily preferred, perhaps because of certain factors such as steric hindrance and rather drastic reaction conditions may be required in such cases to effect the desired quaternizing condensation. Also, the bis-quaternizing agent may contain any of the various ether, ketone, etc. inert linkages hereinbefore described; but again it will be found sometimes that certain of these bis-quaternizing reagents with inert groups therein are less reactive than the preferred materials already described. For example, the dichloro ethyl ether is comparatively difficult to react in the bis-quaternizing reaction, but such materials as dichloro butyl ether, dichlorobutyl thioether, dichloro butyl ketone, and the like are typical bis-quaternizing reagents containing inert groupings therein, which inert groupings are not particularly effected by the bis-quaternizing reaction if chlorides and particularly bromides are employed. Thus intermediate inert ether, thioether, cyano, methylene, nitro, carboxyl, thionyl, etc. groups connecting to bromo butyl groups, for example, may be employed in the reaction for purposes of bis-quaternization via the bromo groups which are highly reactive, particularly in substituted and/or unsubstituted halogenated hydrocarbons having two terminal —CH₂Cl, —CH₂Br, and/or —CH₂I groups for the quaternization condensation.

Expressed in simpler terms, the invention resides in a polymeric compound represented by the general formula:

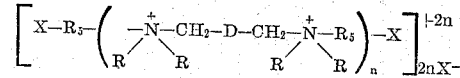

wherein each R is a lower alkyl group, D is a dimeric fat hydrocarbon radical, each X is a halide group, n is a small integer of at least one, and each $R_5$ is a divalent radical having separate terminal —CH₂— groups selected from alkylene of 2 to 4 carbon atoms, alkyleneoxyalkylene and alkylenethioalkylene wherein the alkylene groups contain 2 to 4 carbon atoms or benzene.

*Theory of the invention*

Although it is not desired to limit the invention to any particular theory, it is believed that the condensation products of (I) and (II) obtained in the practice of the instant invention result in several different structures, particularly in connection with the structure of the polymeric cation. For example, the reaction of 1 mol of bis-tertiary amine (I) with 2 mols of bis-quaternizing reagent (II) is understood to produce a low polymer (III) generally in accordance with the following equation:

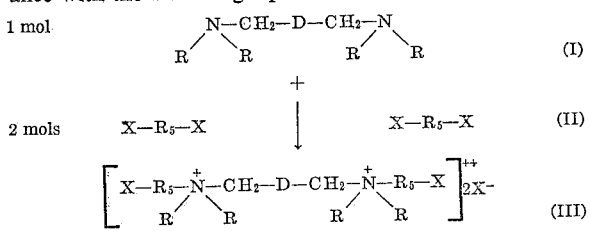

It will be seen that in the cation of (III), there are only two repeating units of the reagent group $R_5$. Next, it will be appreciated that as the number of mols of the reagent (II) is decreased, approaching a molar ratio of 1:1, it will be seen that one may expect to obtain a higher polymer. For example, with only a slight molar excess of reagent (II), one obtains a polymer:

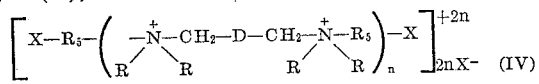

which polymer is really the salt (III) when $n$ equals 1 (and the molar ratio of $D:R_5$ is then 1:2). As the molar ratio of (I):(II) approaches 1:1 it can be seen that $n$ becomes an increasingly greater integer, in theory, although it is limited practically by the cationic size which the reaction conditions will afford. The cation may thus be expressed as:

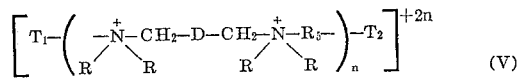

wherein $T_1$ is the terminal group $X—R_5—$ and $T_2$ is the terminal group $—X$.

If instead, we increase the molar ratio of (I):(II) beyond 1:1 and up to 2:1, we then obtain the salt (VI):

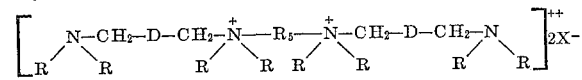

or

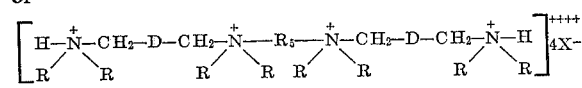

since a tertiary amine group

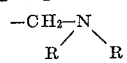

in the presence of the halide anion (Cl) e.g. may be referred to as a tertiary ammonium compound:

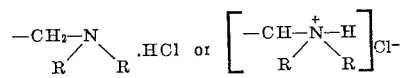

In the foregoing situation, if the molar ratio of (I):(II) is reduced from 2:1 toward 1:1, then we obtain a polymeric salt (VII):

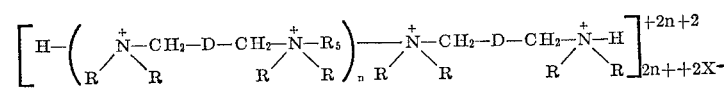

which cation can again be expressed as (Va):

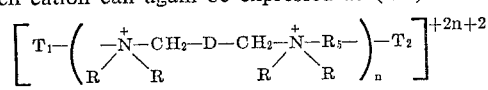

wherein $T_1$ is H and $T_2$ is $—\overset{+}{N}—CH_2—D—CH_2—\overset{+}{N}—H$ and again
              R  R            R  R it will be seen that if $n$ is one in (Va) we obtain the cation of (VI) or (VIa). At substantially equal molar ratios of (I):(II), then it would be assumed that the cation would again have the suggested structure (Va), only $T_1$ would be H and $T_2$ would be $—X$, as in (Vb):

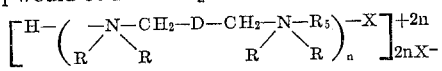

The substantial size of the D group minimizes chances of cyclic formation, but $n$ again is limited essentially by the practicalities of molecular size.

It must be appreciated, of course, that this category of organic chemistry is too complicated to assume a great deal more than the probable formation of linear type polymers, over perhaps the entire spectrum of molecular or structural formulas ranging from the very low polymer structure of the cation (III) through the high polymeric cation structures indicated at (IV) and again at (VII) and finally in (Vb) here indicated as what might be assumed to be the polymer with the maximum number of units in view of the substantially equimolecular proportions of (I) and (II) employed, and then the polymer size would tend to decrease ultimately reaching the low polymer (VI) at the other end of the spectrum, which is formed of only a single divalent reagent group $R_5$ and two bis-tertiary amine units. It has been shown herein, however, that by making the assumption that even a terminal tertiary amine group in the cation, will theoretically add the H cation to form the theoretical tertiary ammonium group, with the net result that the previously mentioned cationic structure (V) may be considered to describe all of these various polymeric cations in the following generic expression (Vc):

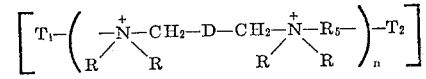

where $n$ is an integer of at least one and we have the possible combinations:

| for | $T_1$ | and | $T_2$: |
|---|---|---|---|
| (Va) | H— | | $—\overset{+}{N}—CH_2—D—CH_2—\overset{+}{N}—H$<br>R  R            R  R |
| (Vb) | H— | | —X |
| (orig. V) | X—$R_5$—<br>(Which makes adjacent<br>$\overset{+}{N}$ a quat.) | | —X |

It will thus be seen that (Vc) might be considered generic to all or mixtures of all cations actually produced over the range (I):(II) of molar ratios 1:2 to 2:1. It is logical to assume that all of the aforesaid cationic structures do exist simultaneously, simply because the reactions producing the same are demonstrably competitive. Thus, as the molar ratio of (I):(II) is increased from 2:1 toward 1:1, or, conversely, is increased from 1:2 to 1:1, the resulting polymeric salt becomes an increasingly viscous material (usually ultimately gelling), which suggests increasing polymeric molecular size with increase in the value of $n$ in the structures (IV), (VII) or (Vb); but such results do not preclude entirely the structures (III) (III) or (IV) and merely indicate that the structures (IV), (VII) and/or (Vb) predominate.

Since gellation per se is not necessarily a desired result from economic and handling points of view, predominance of the theoretical structures (IV) and (VII) would appear to be preferable. Also, since maximizing poly-quaternary ammonium content is preferred for the uses contemplated herein the preferred range for the molar ratio of (I):(II) is 1:2 to 1:1 (or perhaps 1 or 2 molar % less, i.e., 1:1.02) in order to obtain predominance of and maximum benefit from the structure (IV). The higher quaternary content of the quaternized cationic structure (IV) makes these materials most attractive as biocides, flocculants, complexing agents, anti-stats, and for bentonite gelling agents, all of which uses are contemplated in the practice of the invention. It will further be appreciated, however, that the essential concept of the polymer structure for the cation lends itself readily to variations to suit particular needs. The group —D— is of sufficient size to provide the desired hydrophobe properties as well as substantially eliminate undesirable tendencies toward cyclic formation in the polymeric cationic structure; whereas the polymer itself is readily adapted to selective hydrophobe-hydrophil balance not only in the selection of —$R_5$— (which is preferably a smaller group, but may afford some selectivity in the hydrophobe-hydrophil balance even in the preferred forms which may contain a hydroxy group or may contain olefinic unsaturation). More important, however, in balancing the hydrophobe-hydrophil characteristics of the cationic polymer is the fact that the quaternary ammonium content may be readily balanced against the presently known characteristics of the dimer fat radical —D—, and such balancing of the quaternary ammonium nitrogen content in the cation is effected not only by selectivity with respect to the materials used, but also by selectivity with respect to the relative molar proportions, which are apparently relatively significant with respect to the overall size or molecular weight of the polymeric cation for the reasons already mentioned.

In many preferred uses for the cationic salts of the invention, and particularly with respect to such uses as flocculation of slime, it will be appreciated that the upper limit to the size or molecular weight of the cation will be determined to a substantial extent by the desired extent of water-solubility, dispersibility or solubility in whatever liquid medium such as an aqueous alcohol liquid medium that may be contemplated for the particular use. Ordinarily in the flocculation of slime, the liquid medium is essentially water and a certain degree of water-solubility is required for functionality of the compound in this capacity. Although experts in the field of solvent chemistry, detergency, and related fields do not agree on the academic aspects of water-solubility of numerous compounds in this general category, the solubility with which we are presently concerned is a sufficient degree of solubility to afford such a minute dispersion of the material in the extremely dilute concentrations employed that it at least "appears" to be water-soluble for most test purposes and to the ordinary observer. This particular test for "water-solubility" is not determined by whether or not the material gels during the condensation reaction involving the formation thereof, in the presence or absence of a suitable solvent for the reaction, but rather depends upon the behavior of the material in the dilute concentrations contemplated for the uses involved. Thus a material of the invention which may gel during formation, or may be retained in alcoholic solution after formation, but "act" relatively water-insoluble in high concentrations, is, in the practice of the instant invention, still water-soluble for use in flocculation of slimes and sludges, biocides, etc. wherein it is used in very dilute concentrations and gives the essential appearance of going into the water solution to carry out its desired function. Thus, although actual gellation under the particular conditions of reaction will quite often have the net effect of terminating the reaction and thus limiting the total number of polymer units, designated herein by the integer "n" in any given circumstance, but the resulting material obtained may generally be further polymerized under more selective conditions of reaction or condensation, such as desired, but on the other hand it is not desirable to advance such condensation beyond the stage of water-solubility of the cationic polymeric product in the dilute concentrations ordinarily contemplated for use. For this reason, the cationic salt of the instant invention is properly referred to as a water-soluble material and water-solubility, for the uses contemplated in connection with dilute aqueous systems is thus a practical limit to the molecular size of the cation and/or the number of units "n" in the polymeric cation (and, as previously mentioned, actual water-insolubility for uses of the type contemplated is seldom if ever reached under the ordinary conditions of reaction described herein for the formation of the polymeric cationic salt).

In spite of the previously mentioned theoretical considerations concerning the nature and structure of the polymeric cation here involved, and in spite of the fact that all of these various structures are believed to be obtained and to exist in the course of the instant reactions involving the formation of such polymeric cations, it is believed more reasonable to the skilled worker in the art to refer to these cations in the general type of descriptive language employed for polymers, generally, of the linear type formed by co-condensation or coreaction of different di-functional materials (e.g. dihydric alcohol-dicarboxylic acid polyesters and the like), and for this reason the instant materials have been defined as substantially linear polymeric condensates of the instant bis-tertiary amine (I) and the instant bis-quaternizing reagents (II), although the dimer fat amine characteristic of the bis-tertiary amines (I) is of considerable significance in appreciating the nature and scope of the invention and such language is employed in the instant description of claims to impart significance to the use of the dimer fat amines herein.

It will be understood that modifications and variations may be effected without departing from the spirit and scope of the novel concepts of the present invention.

We claim as our invention:

1. A polymeric compound represented by the formula:

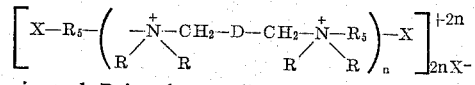

wherein each R is a lower alkyl group, D is a dimeric fat hydrocarbon radical, each X is a halide group, n is a integer of at least one, and each $R_5$ is a divalent radical having separate terminal —$CH_2$— groups selected from alkylene of 2 to 4 carbon atoms, alkyleneoxyalkylene and alkylenethioalkylene wherein the alkylene groups contain 2 to 4 carbon atoms or benzene.

2. A chloride salt whose cation is a poly-quaternary ammonium condensate N,N,N',N' - tetramethyl dimeric fat diamine of dimerized linoleic acid and 1,4-dichlorobutene-2.

3. A chloride salt whose cation is a poly-quaternary ammonium condensate N,N,N',N'-tetramethyl dimeric fat diamine of dimerized linoleic acid and 1,3-dichloropropane-2-ol.

4. A chloride salt whose cation is a poly-quaternary ammonium condensate N,N,N',N'-tetramethyl dimeric fat diamine of dimerized linoleic acid and 1,4-bis(chloromethyl) benzene.

5. A chloride salt whose cation is a poly-quaternary ammonium condensate of N,N,N',N'-tetramethyl dimeric fat diamine of dimerized linoleic acid and bis-(2-chloroethyl) ether.

References Cited
UNITED STATES PATENTS

| | | | |
|---|---|---|---|
| 2,261,002 | 9/1941 | Ritter | 260—567.6 |
| 2,375,853 | 5/1945 | Kirby et al. | 260—567.6 |
| 2,520,275 | 8/1950 | DuBois et al. | 260—567.6 |
| 2,933,529 | 4/1960 | Hwa | 260—567.6 |

CHARLES B. PARKER, *Primary Examiner.*

JOSEPH P. BRUST, *Examiner.*

R. V. HINES, *Assistant Examiner.*